United States Patent Office 3,408,416
Patented Oct. 29, 1968

3,408,416
METHOD FOR BUTENYL CYCLOHEXENES
Wolfgang Schneider, Broadview Heights, Ohio, assignor to The B. F. Goodrich Company, New York, N.Y., a corporation of New York
No Drawing. Filed Oct. 20, 1966, Ser. No. 587,954
10 Claims. (Cl. 260—666)

ABSTRACT OF THE DISCLOSURE

Butenyl cyclohexene is prepared from ethylene and vinyl cyclohexene by reaction in the presence of a coordination compound of nickel such as bisacrolein nickel, bisacrylonitrile nickel, bisfumaryl chloride nickel and bisfumaryl nitrile nickel and an aluminum halide or boron halide etherate.

---

This invention relates to an improved method for preparing butenyl cyclohexenes.

Butenyl cyclohexen is prepared by dimerizing ethylene with vinyl cyclohexene in accordance with this invention in improved yields by reacting ethylene with vinyl cyclohexene in the presence of a nickel complex mixed with an aluminum halide or a boron etherate.

The nickel complexes include, for example, bisacrolein nickel, bisacrylonitrile nickel, bisfumaronitrile nickel, bisfumarylchloride nickel, biscinnamonitrile nickel, biscinnamylchloride nickel, and biscinnamaldehyde nickel. The complex nickel compounds are easily prepared by refluxing nickel carbonyl with acrylonitrile, acrolein and the like. Other useful coordination compounds include pure nickel olefin complexes such as bis(cyclooctadiene - 1,5) nickel and the like.

The aluminum halides include aluminum chloride, aluminum bromide and alkyl aluminum halides of the formula $R_{(1-2)}AlX_{(2-1)}$ wherein X is chlorine or bromine and R is an alkyl radical containing 2 to 12 carbon atoms. Typical alkyl aluminum halides include dialkyl aluminum halides and alkyl aluminum dihalides as ethyl aluminum dichloride, dipropyl aluminum chloride, diisobutyl aluminum chloride, butyl aluminum dichloride, dihexyl aluminum bromide, ethyl aluminum sesquichloride and the like, where $R+X=3$.

The amount of the two catalyst components used may be varied from about 0.0001 to 10 millimols, preferably about 0.001 to 1, per mol of olefins, in a molar ratio of greater than one mol of alkyl halide per mol of nickel complex up to a molar ratio of 10 to 1 and the same ratio for the boron halide.

The catalyst may be prepared by adding the components separately to a reactor, preferably either in the ethylene or vinylcyclohexene or in an inert solvent such as benzene or toluene. Either catalyst component may be charged first and the other added gradually thereto while stirring the entire reaction mixture. This reaction mixture, prepared in situ or separately, is heated in the presence of the olefins preferably at a temperature of about —20° C. to 150° C., preferably 10° C. to 60° C. The reaction is conducted under sufficient pressure to keep the reactants in liquid state. This will depend on the temperature of reaction. After the reaction the excess alpha-olefin is removed and the product distilled to isolate the desired products.

EXAMPLE

In a series of preparations, the nickel complex in vinylcyclohexene was charged to an oxygen- and moisture-free reactor. The aluminum or boron halide in vinylcyclohexene was slowly added with stirring. The resulting mixture was then charged to an autoclave which was purged with argon and then sealed and pressured with ethylene. The autoclave was heated to 80°. After 1.5 to 65 hours the pressure was released and the reaction products distilled off. The reactants and amounts, and product distribution, are set forth in the table.

TABLE

|  | 1 | 2 | 3 | 4 | 5 | 6 | 7 |
|---|---|---|---|---|---|---|---|
| Nickel complexes: | | | | | | | |
| Bisacrylonitrile nickel (grams) | | .7 | | | | | |
| Bisacrolein nickel (grams) | 2.7 | | | | .6 | .7 | .4 |
| Bisfumarylnitrile nickel (grams) | | | 1.2 | | | | |
| Bisfumaryl chloride nickel (grams) | | | | 1.2 | | | |
| Metal halides: | | | | | | | |
| Diisobutyl aluminum chloride (ml.) | | 2 | | 2 | | | |
| Ethyl aluminum sesquichloride (ml.) | 10 | | 2 | | | | |
| Diethyl aluminum chloride (ml.) | | | | | 2 | | |
| Aluminum bromide (grams) | | | | | | 3.5 | |
| Boron halide etherate (ml.)[1] | | | | | | | 1 |
| Starting materials: | | | | | | | |
| 4-vinyl cyclohexene (grams) | 1,512 | 90 | 83 | 90 | 90 | 80 | 90 |
| Ethylene (grams) | 470 | 51 | 44 | 40 | 40 | 52 | 42 |
| Time (hours) | 1.5 | 40 | 65 | 40 | 45 | 45 | 45 |
| Product Analysis (percent): | | | | | | | |
| Vinyl cyclohexene | 7.3 | 27 | 6.2 | 71 | 1 | 18 | 69 |
| Ethylidene cyclohexene | 20.8 | 41 | 8.6 | 5 | 40 | 9 | 1 |
| 4(1-butenyl)cyclohexene | 62.5 | 32 | 64.2 | 24 | 48 | 54 | 22 |
| 4(alpha-methylene propyl)cyclohexene | 9.4 | | 21 | | 11 | 19 | 8 |

[1] $BF_3(C_2H_5)_2O$. 

The boron halide may be the iodide, chloride, bromide or fluoride.

The 4(1 - butenyl)cyclohexene is readily isomerized by known methods to 4(3 - butenyl)cyclohexene which then can be interpolymerized with ethylene or ethylene and propylene with a reduced titanium or Ziegler type catalyst to provide a sulfur-curable elastomer.

I claim:

1. The method of preparing butenyl cyclohexene which comprises contacting ethylene and vinyl cyclohexene with a halide selected from the group consisting of aluminum halides and boron halide etherates; and a nickel complex selected from the group consisting of bisacrolein nickel, bisacrylonitrile nickel, bisfumaronitrile nickel, bisfumarylchloride nickel, biscinnamonitrile nickel, biscinnamylchloride nickel, and biscinnamaldehyde nickel.

2. The method of claim 1 wherein the nickel complex and aluminum halide are present in a molar ratio of greater than one mol of aluminum halide per mol of nickel complex.

3. The method of claim 2 wherein the aluminum halide is aluminum chloride or aluminum bromide.

4. The method of claim 1 wherein the boron halide etherate is $BF_3(C_2H_5)_2O$.

5. The method of claim 2 wherein the aluminum halide is an alkyl aluminum halide of the formula $$R_{(1-2)}AlX_{(2-1)}$$

wherein X is selected from the group consisting of chlorine and bromine and R is an alkyl radical containing 2 to 12 carbon atoms and $R+X=3$.

6. The method of claim 5 wherein X is chlorine and R contains 2 to 4 carbon atoms.

7. The method of claim 6 wherein the nickel complex is bisacrylonitrile nickel.

8. The method of claim 6 wherein the nickel complex is bisacrolein nickel.

9. The method of claim 6 wherein the nickel complex is bisfumarylnitrile nickel.

10. The method of claim 6 wherein the nickel complex is bisfumaryl chloride nickel.

References Cited

UNITED STATES PATENTS

| | | | |
|---|---|---|---|
| 2,969,408 | 1/1961 | Nowlin et al. | 260—683.15 |
| 3,272,879 | 9/1966 | Stahly | 260—666 |
| 3,152,158 | 10/1964 | Clark | 260—666 |
| 3,251,893 | 5/1966 | Feldman et al. | 260—666 |

DELBERT E. GANTZ, *Primary Examiner.*

V. O'KEEFE, *Assistant Examiner.*